July 1, 1924.
E. E. DEWEY
1,499,807
AUTOMOBILE BRAKE
Filed June 15, 1922
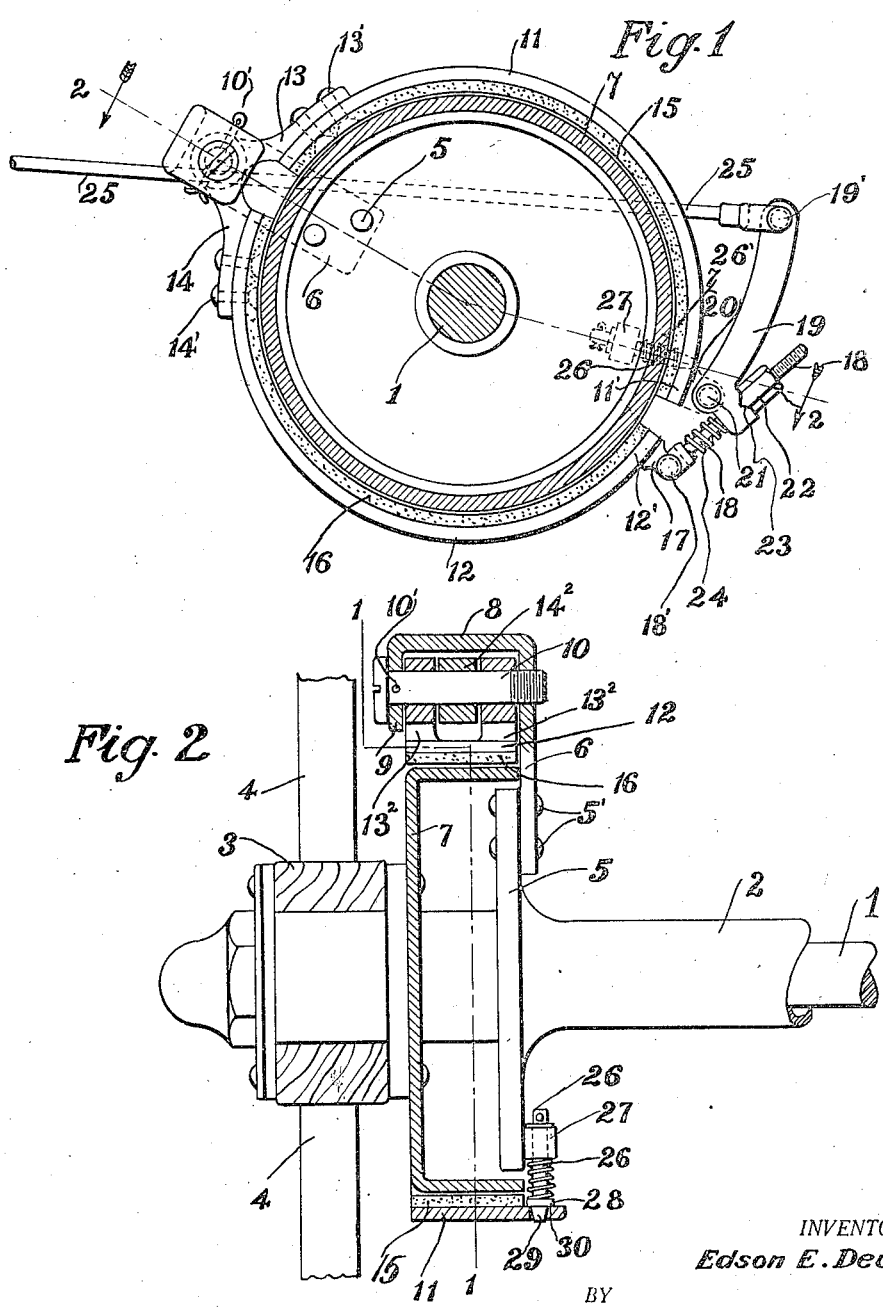
INVENTOR.
Edson E. Dewey
BY
Harry N. Bowen
ATTORNEY.

Patented July 1, 1924.

1,499,807

UNITED STATES PATENT OFFICE.

EDSON EUGENE DEWEY, OF LEE, MASSACHUSETTS.

AUTOMOBILE BRAKE.

Application filed June 15, 1922. Serial No. 568,395.

*To all whom it may concern:*

Be it known that I, EDSON EUGENE DEWEY, a citizen of the United States of America, residing at Lee, in the county of Berkshire and State of Massachusetts, have invented certain new and useful Improvements in Automobile Brakes, of which the following is the specification.

This invention relates to improvements in brake mechanism and particularly to such mechanism which are used upon motor vehicles.

Broadly the invention comprises a pair of substantially semicircular brake bands adapted to encircle the brake drum of the vehicle and with means for pivotally connecting the sections of the band together, whereby when the pivot pin is removed the sections of the bands may be readily withdrawn from the drum and reapplied without the necessity of removing the wheel or jacking up the car, which is the usual practice.

A further object is to attach the operating mechanism for contracting the bands at substantially one-half turn, or 180° toward the rear part of the brake drum instead of at the forward part of the drum which is the present practice which is a very inaccessible location for removing the bands when repairing or relining is necessary.

Further objects of the invention will appear in the body of the specification and will be particularly pointed out in the claims.

Referring to the drawings:

Fig. 1 is a vertical sectional view substantially on the line 1—1 of Fig. 2 showing the brake drum in section; the sections of the brake bands and the operating mechanism in side elevation, and the pivot pin which connects the sections of the bands together.

Fig. 2 is a sectional view on the line 2—2 of Fig. 1 showing the brake bands and the brake drum in section also the spring actuated pin for retaining the band in place.

Referring to the drawings in detail:

1 designates one of the members of the usual rear axle of the car, 2 the housing member, 3 designates the hub of the wheel and 4 the spokes. Attached to or formed integral with the housing 2 is the flange 5 and attached to this flange by the rivets 5' is the upwardly extending bracket 6 which is carried across the brake drum 7 as indicated at 8 and down the side as indicated at 9. This bracket serves to support the pivotal pin 10 which connects the sections of the brake bands 11 and 12 together. This is accomplished by means of the brackets 13 and 14 which are connected to the sections 11 and 12 respectively by the rivets 13' and 14'. The portion 13² of the bracket 13 and 14² of the bracket 14 are hinge parts of these brackets through which the pin 10 passes. The brake band sections 11 and 12 are provided with the usual linings 15 and 16. Diametrically located with relation to the pin 10 are the free and spaced ends of the bands 11 and 12 as indicated at 11' and 12'. Connected to the end 12' is a bracket 17 and pivotally connected to this bracket is a threaded rod 18 which passes through an opening in the angular shaped lever 19 which is pivotally connected to the bracket 20 on the end 11' of the band 11; the pivot of this lever being indicated at 21. 22 is a nut threaded on to the rod 18. This nut is formed with a wedge shaped end which enters a V-shaped recess 23 in the lever 19, as shown, whereby the nut is prevented from becoming loose and whereby the tension of the spring 24 on the rod 18 will be maintained. Connected to the lever 19 by means of the pin 19' is the usual brake rod or operating rod 25 which extends forward to the usual foot operating pedal, not shown.

In order to prevent the sections of the brake bands from slipping endwise and for radially spacing and preventing the upper brake band 11 from dragging on the drum, a spring actuated bolt 26 passes loosely through a fin or lug 27 on the flange 5, the outer end of which is formed with a collar 28 against which the spring presses to force the cone-shaped portion 29 into an opening 30 in the upper brake band section 11. As this pin is connected to the flange 5 it is clear that the upper brake band section 11 would be retained in place and as this band is pivotally connected to the lower band 12 through the pivot pin 10 the band section 12 will also be retained in place against lateral displacement.

It will be seen that by simply removing the pivot pins 10 and 19' the two band sections may be readily removed from the brake drum 7 without the necessity of removing the vehicle wheel or jacking up the car since the pivot 21 of the lever 19 and the pivot pin 18' at the lower end of the bolt 18 will serve to permit the band sections to open, and the entire brake band mechanism removed from the brake band. New linings may then be placed on the sections of the band and replaced on the drum by simply passing the pin 10 through the portions $13^2$ and $14^2$ of the brackets and pin 19' in the lever 19. The spring pin 26 is replaced in the opening 30 of the upper band 11.

The pin 26 serves to normally retain the upper band section 11 away from the brake drum 7 to prevent drag. The spring 24 also serves to retain, or hold, the lower band section 12 away from the drum 7. When the link 25 is operated to apply the brakes the spring actuated pin 26 will be moved inward as readily understood.

A cotter pin 10' prevents the loss of the pivot pin 10. It will be seen that by locating the pin 10 at the front the operator can simply reach through the spokes and remove the pins 10 and 19'; or in other words it will be seen that by locating the cotter pin 10' in the portion 9 of the bracket the operator can easily reach through the spokes and remove the pin 10. Pin 19' can be conveniently removed by reaching under the rear end of the mud guard, or through the spokes.

What I claim is:

1. In a brake construction, the combination, with a pair of external band sections, means for pivotally connecting the same together, and for supporting the sections on the axle housing, and means for retaining the band sections in place to prevent lateral displacement, said means comprising a spring actuated pin on the housing engaging an opening in one of said band sections.

2. In a device for the purpose described, the combination with a brake drum, of two brake members, brackets with openings attached to the members, a bracket connected to the axle housing, for supporting a pivot pin, said pin passing through the openings of the brackets on the brake members, a spring actuated bolt on the housing for engaging one of the brake members for retaining this member normally away from the drum to prevent its dragging thereon, when not operated for braking purposes, additional means for connecting the brake members together to permit said members to be moved against the drum but normally retaining the other brake member away from the drum to prevent dragging, and said spring actuated bolt acting to retain the brake members against lateral displacement relative to the brake drum.

3. In a band brake mechanism for motor vehicles, the combination with the brake drum, a pair of external band sections cooperating with said drum, an axle housing, a bracket member attached to the housing and having a part which extends over the said drum and located at the forward side of the drum, brackets attached to each of the said band sections and formed with an opening therethrough, a pivot pin in the part of the bracket which extends over said housing and passing through the opening in each bracket which is attached to the band sections, said band sections having free and spaced ends which are located opposite the said pivot pin and at the rear side of the drum, a threaded rod and lever pivotally connected respectively to the spaced ends of the bands, a spring on the rod engaging the lever for retaining one of the bands out of contact with the drum, a nut on the rod engaging the lever for adjusting the tension of the spring and a link connected to the lever for moving the band sections into contact with the drum and a spring actuated pin on the housing engaging one of the band brake sections for retaining the band sections against lateral displacement and out of contact with the drum, all constructed and arranged to permit easy access to the said sections for removal from the drum when the pivot pin at the front side of the drum and the pivot pin which connects the lever with the link are removed.

EDSON EUGENE DEWEY.